R. N. WALL.
SAW.
APPLICATION FILED MAY 7, 1915.
1,178,362.
Patented Apr. 4, 1916.
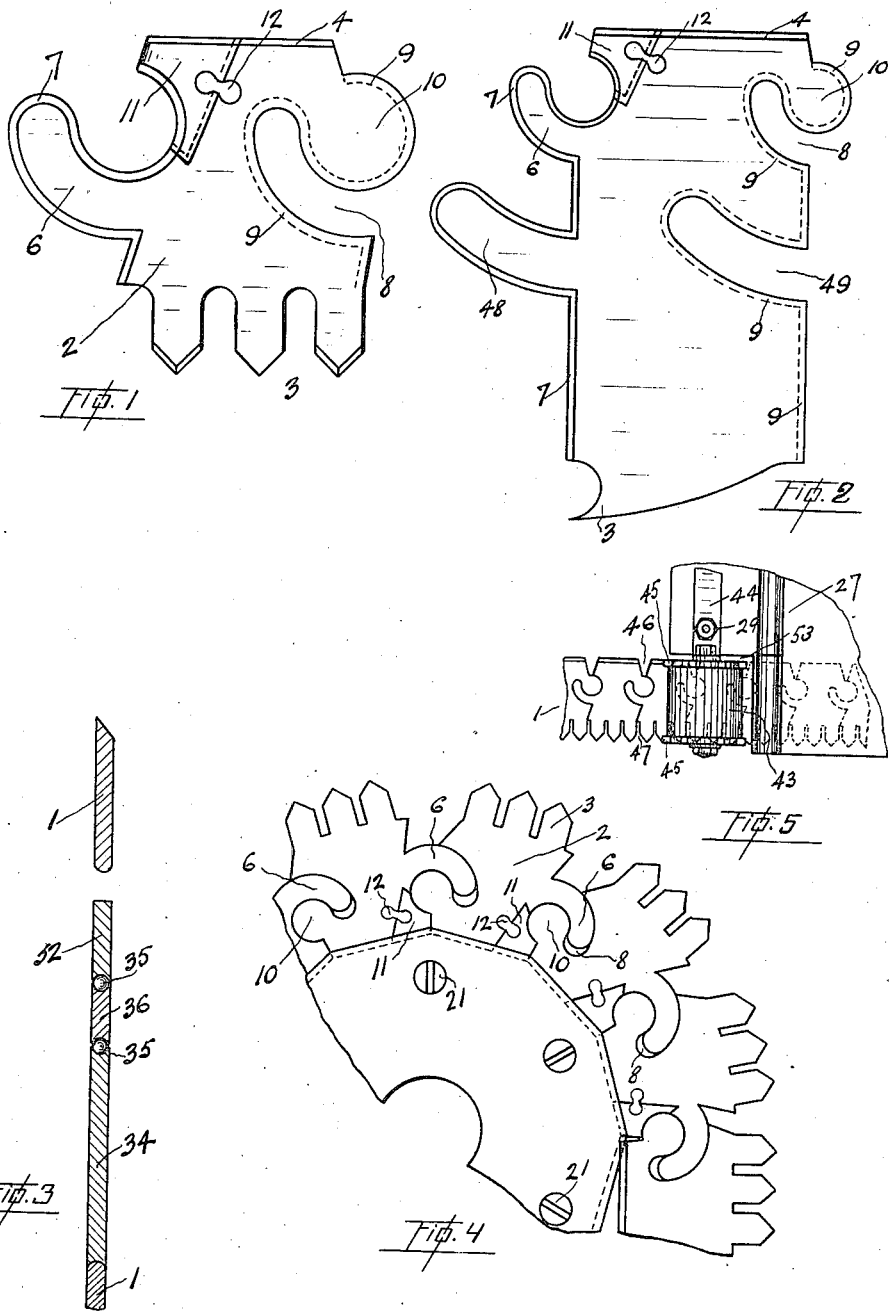

UNITED STATES PATENT OFFICE.

RODE NICOLAY WALL, OF VANCOUVER, BRITISH COLUMBIA, CANADA.

SAW.

1,178,362.  Specification of Letters Patent.  Patented Apr. 4, 1916.

Application filed May 7, 1915. Serial No. 26,493.

*To all whom it may concern:*

Be it known that I, RODE NICOLAY WALL, a subject of the King of Great Britain, and a resident of the city of Vancouver, in the Province of British Columbia, Canada, have invented certain new and useful Improvements in Saws, of which the following is a specification.

My invention relates to improvements in saws, and the object of my invention is to devise a sectional mechanically operated saw which is light and portable, and which is adapted, with equal facility, for use either in sawmills or outdoors in the woods.

A further object is to devise a sectional saw in which the joints are so designed that the saw will turn freely around its sheaves and which will thereafter lock securely so that the saw acts as a solid blade when passing through the timber.

A still further object is to devise a sectional lock joint saw having means for freeing the joints of the sections of the saw from sawdust when the saw is in operation.

I attain these objects by the means illustrated in the accompanying drawings in which—

Figure 1 is a side view of one of my blade sections. Fig. 2 is a side view of a section when a wide bladed saw is required. Fig. 3 is a sectional view of my saw. Fig. 4 is a fragmentary detail view showing the saw passing around the sheave. Fig. 5 is a view showing the operation of the toothed idler.

Similar figures of reference indicate similar parts throughout the several views.

1 indicates the saw blade, which is composed of a number of sections 2, similar to the section shown in detail in Fig. 1. Each section is provided on one edge with cutting teeth 3, while its other edge is beveled or rounded as indicated at 4 in Figs. 1 and 3, for the purpose hereinafter mentioned. The ends of each section are formed as shown particularly in Fig. 1, that is, one end is provided with a tongue 6 the edges 7 of which are beveled, while out of the other end is cut a portion 8, the edges 9 of which are grooved, as indicated by the dotted line in Fig. 1, the size of which portion 8 is such that the tongue 6 of the adjacent section will fit slidably therein, the beveled edges 7 then lying in the grooved edges 9.

A circular disk shaped portion 10 is formed, as shown in Fig. 1, adjacent the cut out portion 8, which disk 10 is adapted to fit slidably on the concave side of the tongue 6 of the adjacent section, as shown in Fig. 4, the groove 9 being continued around the edge of the portion 10, as indicated in Fig. 1, so that the beveled edge 7 of the tongue 6 will fit slidably in the groove 9 when the two sections are assembled together. The respective sections 2 are movably locked together by means of the pieces 11, as shown in Figs. 1 and 4, one such piece 11 being fitted into the edge of each section to bear against the edge of the disk shaped portion 10 when assembled, the piece 11 being rigidly held in place by means of a key 12 which fits an opening in both the piece 11 and the section 2, all as shown in Figs. 1 and 4. The key 12 is riveted over on both sides when the sections are finally assembled together as a complete saw blade.

In order to keep the joints of the blade sections free from sawdust when in operation I provide the toothed roller 43. This roller may or may not be used, according to conditions, but when used it is rotatably carried by the bracket 44, which bracket is secured in a vertical position to a plate of a saw frame by means of the bolt 29 so that the periphery of the roller 43 will bear on the side of the upper saw blade, to be frictionally rotated thereby, the teeth 45 of the roller entering the joints, 46 and 47 in Fig. 5, of the sections as they pass and forcing out any sawdust that may have collected therein. A similar roller is positioned on a plate 27 of saw frame, as shown in Fig. 5, to serve the lower saw blade in the manner just described. The plates 26 and 27 are cut away, as shown at 53 in Fig. 5, to allow for the placing of the rollers in their working positions.

When a wide bladed saw is required, the sections are formed in the manner already described with reference to the sections 2 but they are provided with an additional tongue 48 and a cut out portion 49, as shown in Fig. 2, similar to, but larger than, 7 and 8 of the sections 2, the use of which gives the required rigidity to the wide blade.

What I claim as my invention is:—

1. An endless saw composed of a plurality of toothed sections pivotally connected together end to end, each said section having a slot in one end and a tongue substantially the same length and width as the slot extending from the other end, the tongue of one section fitting slidably the slot of the adjoining section and filling the slot when the said sections are assembled as a cutting blade.

2. An endless saw composed of a plurality of toothed sections connected together end to end, each said section having a curved slot in one end and a disk shaped portion adjacent the said slot and provided with a curved tongue substantially the same length and width as the slot extending from the other end, the said tongue of one section fitting slidably in the slot of the adjoining section and on the edge of the said disk portion so as to form a pivotal connection therebetween, and means for movably locking each section to the other.

3. An endless saw composed of a plurality of sections connected together end to end, said sections being provided on their outer edges with cutting teeth and having their inner edges rounded or beveled, each said section having a curved slot in one end and a disk shaped portion adjacent the said slot and a curved tongue substantially the same length and width as the slot extending from the other end, the tongue of one section fitting slidably in the slot of the adjoining section and on the edge of the said disk portion so as to form a pivotal connection therebetween, the joints of the said sections on their inner edges being normally open when assembled to permit of limited pivotal movement of the sections, and means for movably connecting each section to the other.

4. A toothed section for a sectional saw having a curved slot in one end and a disk shaped portion adjacent the said slot and provided on its other end with a curved tongue of substantially the same length and width as the said slot; a locking member carried by said section adjacent said tongue, and means for securing said locking member to the section.

5. A toothed section for a sectional saw comprising a main portion having a curved slot in one end and a disk shaped portion adjacent the said slot, the edges of said slot and said disk portion being grooved and provided on its other end with a curved tongue of substantially the same length and width as the said slot, the edges of said tongue being beveled, a portion fitting the main portion and forming a continuation of the plain edge thereof and of the said tongue, the extremity of said portion when assembled being cut away on an angle, and a key adapted to lock the said portion to the main portion.

Dated at Vancouver, B. C., this 16th day of April, 1915.

RODE NICOLAY WALL.

Witnesses:
JAMES TAYLOR,
ISOBEL D. ORR.